Sept. 11, 1956 E. W. SAMSON ET AL 2,762,564

BINARY NUMBER SYSTEM CONVERTER

Filed Aug. 10, 1951

INVENTORS
EDWARD W. SAMSON
EDMUND B. STAPLES
BY Wade Koontz
ATTORNEY and
James S. Shannon
AGENT 2,762,564
Patented Sept. 11, 1956

2,762,564

BINARY NUMBER SYSTEM CONVERTER

Edward W. Samson, Watertown, and Edmund B. Staples, Westwood, Mass.

Application August 10, 1951, Serial No. 241,378

1 Claim. (Cl. 235—61)

(Granted under Title 35, U. S. Code (1952), sec. 266)

The invention described herein may be manufactured and used by or for the Government for governmental purposes without payment to us of any royalty thereon.

This invention relates to a converter for producing transformations between two systems of binary numbers. Specifically, it is the object of the invention to provide means for converting cyclic binary number codes into ordinary arithmetical binary number codes, or for reversing the process.

The cyclic system of binary numbers is an arrangement of the number order so as to follow a definite pattern characterized by the change of only one digit between any number and the number adjacent to it. The cyclic system may be used in mechanical commutating coding systems to eliminate any ambiguities as to mechanical position when mutiple contacts or brushes are moved from one number of commutator to an adjacent one. This system of numbers is not adaptable to the ordinary arithmetical processes such as addition, multiplication, etc.

In the ordinary or arithmetical system of binary numbers a quantity is represented as the sum of powers of 2. Hence the value of any positive quantity A may be represented in accordance with this system as $$A=a_n2^n+a_{n-1}2^{n-1} \ldots +a_k2^k \ldots +a_0+ a_{-1}2^{-1}+a_{-2}2^{-2}+ \ldots a_{-k}2^{-k} \ldots +a_{-m}2^{-m}$$

where $n$ and $m$ are positive integers and the coefficients $a_k$ and $a_{-k}$ are either 1 or 0 depending upon whether or not the quantity $2^k$ or $2^{-k}$ appears in A. The coefficients $a_k$ and $a_{-k}$ constitute the binary number and are positioned on either side of the binal point. If A is a whole quantity the coefficients $a_{-k}$ are all zero. Arithmetical computations can be made with this system of binary numbers.

Examples of four-digit binary numbers in accordance with the above two systems are shown below:

| Number order | Cyclic system | Arithmetical system |
|---|---|---|
| 0 | 0000 | 0000 |
| 1 | 0001 | 0001 |
| 2 | 0011 | 0010 |
| 3 | 0010 | 0011 |
| 4 | 0110 | 0100 |
| 5 | 0111 | 0101 |
| 6 | 0101 | 0110 |
| 7 | 0100 | 0111 |
| 8 | 1100 | 1000 |
| 9 | 1101 | 1001 |
| 10 | 1111 | 1010 |
| 11 | 1110 | 1011 |
| 12 | 1010 | 1100 |
| 13 | 1011 | 1101 |
| 14 | 1001 | 1110 |
| 15 | 1000 | 1111 |

The converter operates on the principle that any digit in either a cyclic or arithmetical binary number is dependent only on the corresponding digit in the opposite system and the adjacent, higher-order digits in the arithmetical. If the higher-order digit is 1, the transformation is a reversal (0 to 1 or 1 to 0), whereas, if the higher-order digit is 0, the transformation is without change (0 to 0 or 1 to 1).

The construction and operation of converters in accordance with the invention will be more clearly understood from the specific embodiments thereof to be described in connection with the accompanying drawings in which—

Figure 2:
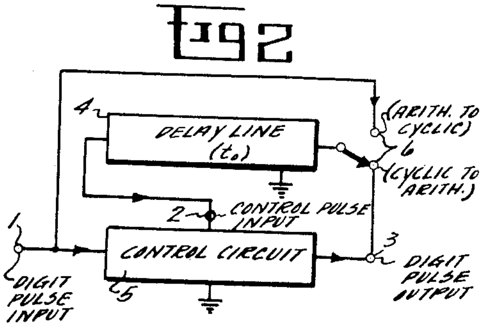
Figure 2 shows a converter for use with series pulse codes.
Figure 3A:
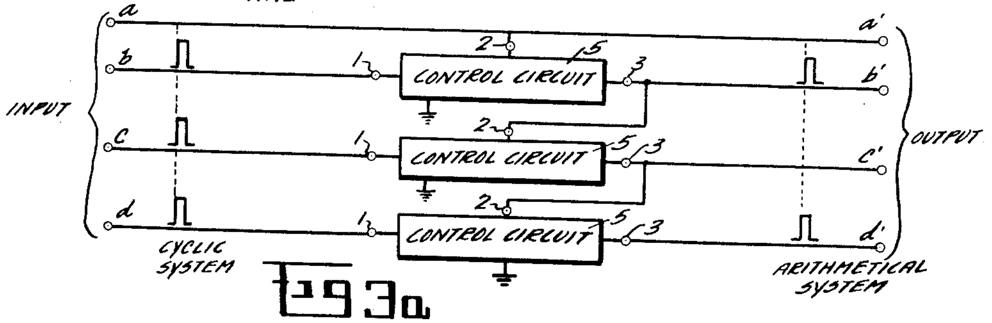
Figure 3B:
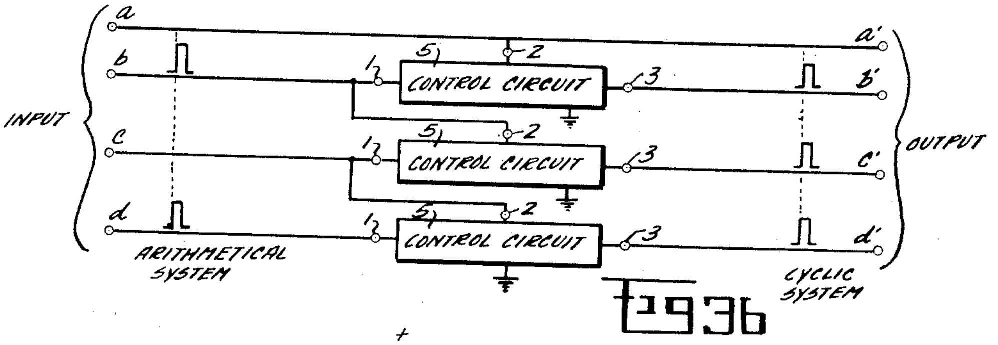
Figures 4, 5:
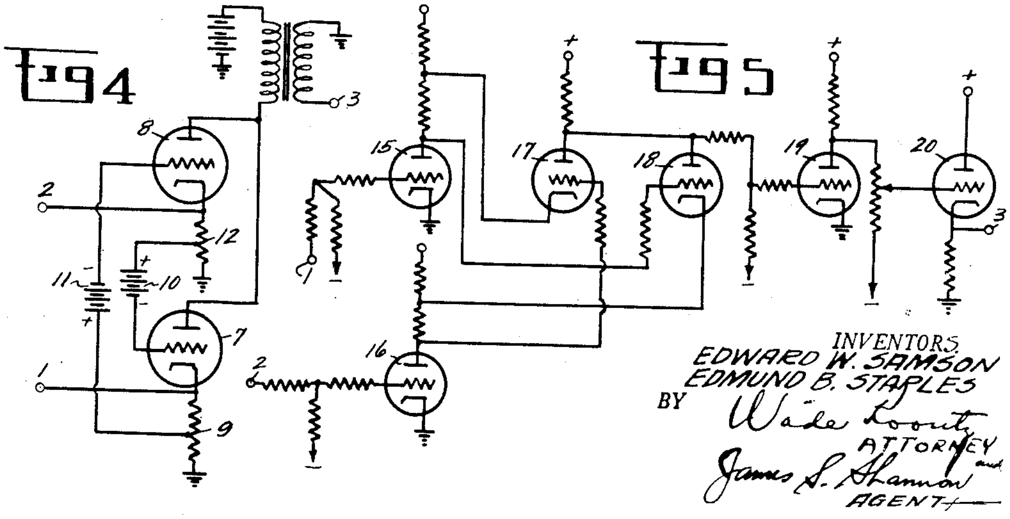

Figures 3*a* and 3*b* show converters for use with pulse codes in which the pulses occur simultaneously; and Figures 4 and 5 show suitable control circuits for use in the converters of Figures 2, 3*a* and 3*b*.

A binary number may be represented electrically as a series of pulses, usually equally spaced, occurring in a single circuit over a period of time, or as a plurality of pulses occurring simultaneously in parallel circuits. The digit 1 is usually represented by a positive pulse, whereas the digit 0 may be represented by a negative pulse or by the absence of a pulse. For example, in Figure 1(*a*) four digit series pulse codes are shown representing the quantity 5 in both the cyclic and the arithmetic systems. The cyclic binary number 0111 is represented by the absence of a pulse at time $t_1$, indicating that the first digit is 0, and the presence of pulses at $t_2$, $t_3$ and $t_4$, indicating that each of the last three digits is 1. The arithmetic binary number 0101 is represented in a similar manner.

A converter in block form for producing transformation between the two systems is shown in Figure 2. The binary number in series pulse form, to be transformed to the opposite system is applied to the digit pulse input terminal 1 and the digit pulses of the resulting transformation appear at the digit pulse output terminal 3.

Delay line 4 has its input connected by means of switch 6, to terminal 1 or 3 on which the arithmetical pulse code appears. Therefore, for transforming the cyclic code to the arithmetical the switch is connected to terminal 3, whereas for the reverse transformation it is connected to terminal 1. The delay $t_0$ produced by line 4 is equal to the spacing of adjacent pulses in the pulse code.

The delayed pulses from line 4 are applied to terminal 2 of control circuit 5 which is interposed between the input and output terminals 1 and 3. The output of control circuit 5 is determined by the combinations of input and control pulses applied thereto in accordance with the following tabulation in which 1 indicates the presence of a pulse and 0 the absence of a pulse:

| Input Pulse (Terminal #1) | Control Pulse (Terminal #2) | Output Pulse (Terminal #3) |
|---|---|---|
| 1 | 0 | 1 |
| 1 | 1 | 0 |
| 0 | 1 | 1 |
| 0 | 0 | 0 |

Figure 1:
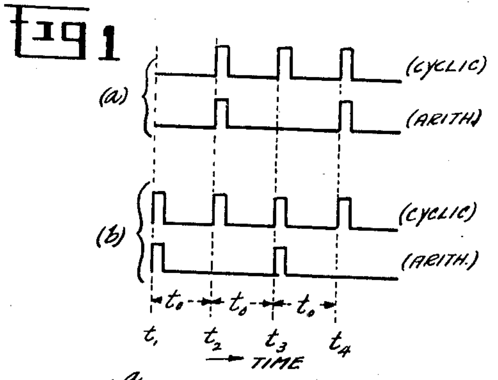
Figure 1 shows examples of pulse binary codes in both the cyclic and arithmetical systems.

The operation of the converter will be clear from a consideration of the transformation of the cyclic binary number of Figure 1(*a*) to the arithmetical binary number of Figure 1(*a*). For this transformation switch 6 is connected to terminal 3. At time $t_1$ there is no input pulse and no control pulse so that no output pulse occurs; at time $t_2$ there is an input pulse but no control pulse so that an output pulse occurs; at time $t_3$ there is an input pulse and a control pulse, derived by delaying the output pulse at $t_2$, so that no output pulse occurs; and at time $t_4$ there is an input pulse but no control pulse so that an output pulse occurs. Application of a cyclic binary pulse code to input terminal 1, therefore, results in its transformation into the corresponding arithmetical binary pulse code at output terminal 3. Conversely, application of an arithmetical binary pulse code to input terminal 1, with switch 6 connected to terminal 1, results in its transformation into the corresponding cyclic pulse code at the output terminal 3. In this case at $t_1$ there is no input or control pulse and therefore no output pulse; at $t_2$ there is an input pulse but no control pulse so that an output pulse occurs; at $t_3$ there is no input pulse but there is a control pulse, derived by delaying the input pulse at $t_2$, so that an output pulse occurs; and at $t_4$ there is an input pulse but no control pulse so that an output pulse occurs.

As a further example of the operation of the converter of Figure 2, the transformation in both directions of the binary numbers 1111 (cyclic) and 1010 (arith.), Figure 1(*b*), representing the quantity 10, is illustrated in the following tabulation:

| | | Input pulse (Terminal #1) | Control pulse (Terminal #2) | Output pulse (Terminal #3) |
|---|---|---|---|---|
| Cyclic to Arithmetical (Switch 6 connected to Terminal 3) | $t_1$ | 1 | 0 | 1 |
| | $t_2$ | 1 | 1 | 0 |
| | $t_3$ | 1 | 0 | 1 |
| | $t_4$ | 1 | 1 | 0 |
| Arithmetical to Cyclic (Switch 6 connected to Terminal 1) | $t_1$ | 1 | 0 | 1 |
| | $t_2$ | 0 | 1 | 1 |
| | $t_3$ | 1 | 0 | 1 |
| | $t_4$ | 0 | 1 | 1 |

The converter shown in Figure 2 is for use with series pulse codes in which the pulses occur at equally spaced time intervals. In cases where the pulse code is of the type in which the various pulses occur simultaneously in parallel channels the converters shown in Figures 3*a* and 3*b* may be used. Referring to Figure 3*a*, the converter shown is designed to handle a four place code and comprises parallel circuits *a*—*a'*, *b*—*b'*, *c*—*c'* and *d*—*d'* each corresponding to one place in the code. If a binary pulse code in the cyclic system is applied to input terminals *a*, *b*, *c* and *d* there will appear at output terminals the corresponding binary pulse code in the arithmetical system. The transformation of the code in Figure 1(*a*) from the cyclic to the arithmetical system is illustrated. The control circuits 5 of Figure 3*a* have the same operational characteristics as the control circuit in Figure 2, namely: (1) a pulse on terminal 1 and no pulse on terminal 2 produces a pulse at terminal 3, (2) no pulse at terminal 1 and a pulse at terminal 2 produces a pulse at terminal 3, (3) a pulse at terminal 1 and a pulse at terminal 2 produces no pulse at terminal 3, and (4) no pulse at terminal 1 and no pulse at terminal 2 produces no pulse at terminal 3.

As already pointed out the transformation of each digit of the code from one system to the other depends only on the corresponding digit in the other code and the next higher order digit in the arithmetical code. The control signal applied to terminal 2 of circuit 5 must therefore always be derived from the arithmetical code signal. Since the arithmetical signal appears at the output side of the converter in Figure 3*a*, the terminals 2 are accordingly connected to the output side. If it is desired to modify the converter of Figure 3*a* to produce the reverse transformation, i. e., from the arithmetical to the cyclic system, it is only necessary to connect the terminals 2 to the input side of the converter when the arithmetical signal now appears. Such a modification is shown in Figure 3*b*. In this figure the transformation from the arithmetical system to the cyclic system of the pulse code in Figure 1(*a*) is illustrated.

Suitable arrangements of the control circuit 5 are shown in Figures 4 and 5. Referring to Figure 4, the tubes 7 and 8 are biased to cut-off by bias sources 10 and 11. If a positive pulse is applied to terminal 1 but no pulse is applied to terminal 2 the cathode of tube 7 will rise in potential as will also the grid of tube 8 which is connected to a tap on resistor 9. The increased potential of the grid of tube 8 will cause conduction in this tube and produce a pulse at output terminal 3. The anode current of tube 8 will also raise the potential of the grid of tube 7 due to its connection to resistor 12, however, no conduction will occur in tube 7 because of the high potential of its cathode to which the positive pulse was applied. If a positive pulse is applied to terminal 2 but no pulse is applied to terminal 1 a pulse is similarly produced at output terminal 3, the only difference being that in this case tube 7 instead of tube 8 conducts. If positive pulses are simultaneously applied to both terminals 1 and 2 the increased cathode potential of each tube prevents either from conducting and no pulse is produced at output terminal 3. And, finally, if there is no signal applied to either terminals 1 or 2, both tubes 7 and 8 remain non-conductive and no output pulse is produced. The control circuit of Figure 4 therefore satisfies the performance requirements for the control circuits 5.

In Figure 5 tubes 15 and 16 are normally biased to cut-off. When both tubes 15 and 16 are non-conductive the electrodes of tubes 17 and 18 are all at the same potential and therefore these tubes are non-conductive. If a positive pulse is applied to terminal 1 but no signal is applied to terminal 2, tube 15 conducts but tube 16 remains non-conductive. Conduction in tube 15 lowers the cathode potential of tube 17 producing a negative pulse in the anode of this tube. This pulse is inverted by direct-coupled amplifier tube 19 and is applied through cathode follower stage 20 to output terminal 3 as a positive pulse. Similarly, if a positive pulse is applied to terminal 2 but no signal is applied to terminal 1, an output pulse appears at terminal 3, the only difference being that in this case tubes 16 and 18 conduct instead of tubes 15 and 17. If positive pulses are applied to both terminals 1 and 2, both tubes 15 and 16 are conductive and the resulting drop in potential on the grids of tubes 17 and 18 maintains both of these tubes in a non-conductive state, so that no output pulse appears on terminal 3. Finally, in the absence of a signal on both terminals 1 and 2 both tubes 15 and 16 are biased to cut-off, and, as already explained, for this condition the electrodes of tubes 17 and 18 are all at the same potential so that no conduction occurs and there is no ouput pulse at terminal 3. Therefore, the circuit of Figure 5 also satisfies the performance requirements for control circuit 5.

What we claim is:

A converter for producing transformations between the cyclic and the arithmetical systems of binary numbers wherein said numbers appear as multiple place electrical binary codes in which each place is characterized by an electrical digit signal consisting of the presence or absence of an electrical pulse and in which said digit signals occur in succession at equal time intervals, said converter comprising a control circuit having an input terminal to which an electrical binary code of the above described type in one of said number systems is applied, an output terminal at which a corresponding electrical binary code in the other of said number systems is produced and a control terminal, and means producing a delay equal to said time interval connected between said control terminal and that terminal of the remaining two terminals of said control circuit at which the arithmetical electrical binary code appears and transmitting energy toward said control terminal, said control circuit comprising a pair of vacuum tubes, means for connecting the control circuit input terminal to the cathode of one of said tubes, means for connecting the control circuit control terminal to the cathode of the other of said vacuum tubes, means for applying a portion of the voltage on the cathode of each of said tubes to the grid of the other tube, means for coupling the anode circuits of said tubes in parallel to the control circuit output terminal, and means for biasing each of said tubes to cut-off whenever the signal on the cathode of the other tube is zero.

References Cited in the file of this patent

UNITED STATES PATENTS

| | | |
|---|---|---|
| 2,505,029 | Carbrey | Apr. 25, 1950 |
| 2,570,220 | Earp | Oct. 9, 1951 |
| 2,570,221 | Earp | Oct. 9, 1951 |
| 2,571,680 | Carbrey | Oct. 16, 1951 |
| 2,596,199 | Bennett | May 13, 1952 |
| 2,600,744 | Eckert | June 17, 1952 |
| 2,632,104 | Lakatos | Mar. 17, 1953 |